(12) United States Patent
Natsume

(10) Patent No.: US 7,474,253 B2
(45) Date of Patent: Jan. 6, 2009

(54) ON-VEHICLE RADAR DEVICE AND VEHICLE CONTROL SYSTEM

(75) Inventor: Kazuma Natsume, Obu (JP)

(73) Assignee: Denso Corporation, Kariya (JP)

( * ) Notice: Subject to any disclaimer, the term of this patent is extended or adjusted under 35 U.S.C. 154(b) by 260 days.

(21) Appl. No.: 11/454,175

(22) Filed: Jun. 15, 2006

(65) Prior Publication Data
US 2006/0284760 A1 Dec. 21, 2006

(30) Foreign Application Priority Data
Jun. 15, 2005 (JP) ............................. 2005-175014

(51) Int. Cl.
*G01S 13/00* (2006.01)
(52) U.S. Cl. .......................................... 342/70; 342/71
(58) Field of Classification Search ................. 342/29, 342/41, 61, 69, 70–72, 75; 701/70, 93, 117
See application file for complete search history.

(56) References Cited

U.S. PATENT DOCUMENTS 6,624,782 B2 * 9/2003 Jocoy et al. .................... 342/70
7,302,325 B2 * 11/2007 Kudo .......................... 701/36
2004/0104837 A1 * 6/2004 Samukawa et al. ............ 342/70

FOREIGN PATENT DOCUMENTS

| JP | 10-000989 | 1/1998 |
| JP | 2005-011239 | 1/2005 |
| JP | 2005-011249 | 1/2005 |

* cited by examiner

*Primary Examiner*—Thomas H Tarcza
*Assistant Examiner*—Peter M Bythrow
(74) *Attorney, Agent, or Firm*—Harness, Dickey & Pierce, PLC

(57) ABSTRACT

A radar transceiver of an on-vehicle radar transmits and receives a radar wave. Objects ahead of a vehicle having the on-vehicle radar are sensed based on the reflected radar wave reflected from the objects. A target vehicle to be monitored is extracted from the sensed objects based on the reflected radar wave. Also, a blind spot object, which is present in a blind spot of the target vehicle is extracted from the sensed objects based on the reflected radar wave.

11 Claims, 5 Drawing Sheets

ON-VEHICLE RADAR DEVICE AND VEHICLE CONTROL SYSTEM

CROSS REFERENCE TO RELATED APPLICATION

This application is based on and incorporates herein by reference Japanese Patent Application No. 2005-175014 filed on Jun. 15, 2005.

BACKGROUND OF THE INVENTION

1. Field of the Invention

The present invention relates to an on-vehicle radar device, which is installed on a vehicle and obtains information about objects around the vehicle and also relates to a vehicle control system, which performs a vehicle control operation based on the information obtained by the on-vehicle radar device.

2. Description of Related Art

A traffic accident may occur in the following situations. For instance, a country where drivers keep to the right side of the road, it could happen that when a vehicle approaches an intersection to make a left turn, the driver of that vehicle is surprised with an oncoming straight-through vehicle that has suddenly appeared from a blind spot of an oncoming left turn vehicle, which is about to make a left turn at a center of the intersection (hereinafter, simply referred to as a left turn vehicle). Also, it could happen that when a vehicle is traveling straight on a street, a driver of that vehicle is surprises with a crossing vehicle that has suddenly appeared from a blind spot of a non-moving vehicle, which is parked on the side of the street (hereinafter, simply referred to as the non-moving vehicle). In the above cases, a collision could happen between the two approaching vehicles in the worst scenario. In view of this, it is desirable to have a technique that provides information about a state in the blind spot of the left turn vehicle or of the non-moving vehicle.

Furthermore, when a preceding vehicle ahead of a compact vehicle is a large vehicle, a view of the driver of the compact vehicle is largely masked by the large preceding vehicle, so that the driver of the compact vehicle cannot recognize a state ahead of the large preceding vehicle. As a result, for instance, when the driver of the large preceding vehicle suddenly applies the brakes, the drive of the compact vehicle cannot react with it, thereby possibly resulting in the collision. In view of the above situation, it is desirable to have a technique that provides information about a state in the blind spot of the preceding vehicle.

Particularly, information about a vehicle in front of the preceding vehicle ahead of the own vehicle is important in an adaptive cruise control (ACC) or a precrash safety system (PCS) at the time of correctly estimating a behavior (an acceleration or a deceleration) of the vehicle in front of the preceding vehicle to smoothly control the speed of the own vehicle.

In view of this, a drive assist system has been proposed to address the above disadvantage. In this system, sensors and/or cameras are arranged at specific points (e.g., intersections and curves of roads) to obtain information at these points. The information, which is obtained through the sensors and/or cameras, is transmitted to a vehicle, which passes through these points, via communication devices arranged at these points, so that the driver of the vehicle can obtain the information of these points.

For example, Japanese Unexamined Patent Publication No. 2005-11249 discloses such a technique. According to this disclosed technique, when the own vehicle approaches an intersection and is about to make a left turn, the own vehicle obtains information about oncoming vehicles through the corresponding communication device. For instance, when a straight-through oncoming vehicle approaches the intersection, a voice warning is provided to the driver of the own vehicle.

Furthermore, Japanese Unexamined Patent Publication No. 10-000989 teaches another technique called an information display system. According to this technique, a camera and/or a radar is provided in a front side of an own vehicle. Visual image, which indicates a state of a road ahead of the own vehicle, and/or information, which is about a preceding vehicle ahead of the own vehicle, are obtained through the camera and/or the radar and are displayed on a display device provided in a rear side of the vehicle. In this way, the obtained information is displayed to a vehicle traveling after the own vehicle.

However, in the case of Japanese Unexamined Patent Publication No. 2005-11249, the infrastructure, such as the sensors and the cameras, which collect the information, and the communication devices, which transmit the collected information, are required. In the current state where such an infrastructure is not well established, the above system is not useful. Furthermore, in order to establish the infrastructure at the useful level, the costs are disadvantageously increased. Also, it is required to provide a communication device to the vehicle side in addition to the road side, resulting in the additional costs to the users.

Furthermore, according to Japanese Unexamined Patent Publication No. 10-000989, the information can be obtained only when the camera and the display device are provided in the preceding vehicle. Thus, the availability of the information fully depends on the other vehicles, and the vehicles having the camera and the display device rarely exist. Therefore, the above technique does not provide the sufficient solution against the blind spot caused by the preceding vehicle.

SUMMARY OF THE INVENTION

The present invention addresses the above disadvantages. Thus, it is an objective of the present invention to provide an on-vehicle radar device, which enables acquisition of information usable for understanding a state in a blind spot of a target vehicle, such as a left turn vehicle, a non-moving vehicle or a preceding vehicle, without a need for an infrastructure provided on a road side. It is another objective of the present invention to provide a vehicle control system having such an on-vehicle radar device.

To achieve the objectives of the present invention, there is provided an on-vehicle radar device, which includes a transmitting and receiving means, an object sensing means, a target vehicle extracting means and a blind spot object extracting means. The transmitting and receiving means is for transmitting and receiving a radar wave in a form of a radio wave. The object sensing means is for sensing a plurality of objects, which are spaced away from a vehicle having the on-vehicle radar device and reflect the transmitted radar wave, based on an output of the transmitting and receiving means. The target vehicle extracting means is for extracting a target vehicle to be monitored from the plurality of sensed objects. The blind spot object extracting means is for extracting a blind spot object, which is present in a blind spot of the target vehicle extracted by the target vehicle extracting means, from the plurality of sensed objects.

To achieve the objective of the present invention, there is also provided a vehicle control system that includes the above on-vehicle radar device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
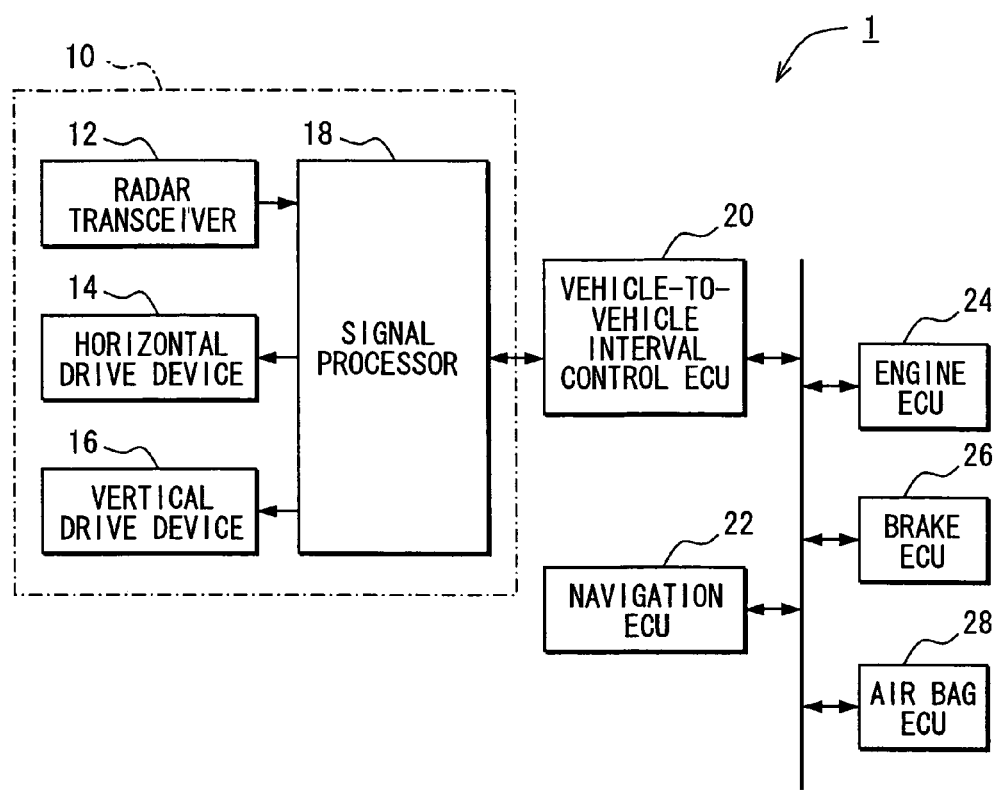
FIG. 1 is a block diagram showing a structure of a vehicle control system according to an embodiment of the present invention.

FIG. 1 is a block diagram showing a structure of a vehicle control system 1 according to the embodiment.

As shown in FIG. 1, the vehicle control system 1 includes a on-vehicle front radar 10, which is arranged in a front end part of a vehicle. The front radar 10 senses an object(s), such as a preceding vehicle, an obstacle, which is located within a predetermined sensing range ahead of the own vehicle having the vehicle control system 1.

The front radar 10 is connected to a vehicle-to-vehicle interval control ECU 20, which is in turn connected to a navigation ECU 22, an engine ECU 24, a brake ECU 26 and an air bag ECU 28 through a LAN communication bus. Furthermore, each ECU 20, 22, 24, 26, 28 includes a known microcomputer as its main component. Furthermore, each ECU 20, 22, 24, 26, 28 includes a bus controller to perform communication through the LAN communication bus. The data communication between the ECUs 20, 22, 24, 26, 28 through the LAN communication bus uses a Controller Area Network (CAN) protocol, which is proposed by Robert Bosch GmbH, Germany and is widely used in vehicle network systems.

The front radar 10 is an FMCW radar and includes a radar transceiver 12. The radar transceiver 12 transmits and receives a radar wave, which is frequency modulated and is in a millimeter wave range. Furthermore, the radar transceiver 12 mixes a local signal, which is a part of a transmitting signal, with a received signal, which is generated based on a reflected wave that is reflected from a target, so that a beat signal is generated. The radar transceiver 12 is constructed to mechanically change its orientation in a vertical direction and a horizontal direction. In accordance with a change in the orientation of the radar transceiver 12, a transmission direction of the radar wave of the radar transceiver 12 is changed.

The radar 10 further includes a horizontal drive device 14, a vertical drive device 16 and a signal processor 18. The horizontal drive device 14 drives the radar transceiver 12 to change the transmission direction of the radar wave in the horizontal direction, i.e., to change the horizontal angle of the transmission direction of the radar wave. The vertical drive device 16 drives the radar transceiver 12 to change the transmission direction of the radar wave in the vertical direction, i.e., to change the vertical angle of the transmission direction of the radar wave. The signal processor 18 controls the transmission direction of the radar wave through the horizontal drive device 14 and the vertical drive device 16. Furthermore, the signal processor 18 generates target information about a target vehicle to be monitored and flag information about an object (hereinafter, also referred to as a blind spot object) in a blind spot of the target vehicle based on sampling data, which is obtained through sampling of the beat signal generated by the radar transceiver 12. The target information includes, for example, a distance from the own vehicle to the target vehicle, a relative velocity of the target vehicle with respect to the own vehicle and/or an azimuth of the target vehicle with respect to the own vehicle. The flag information includes, for example, a vehicle deceleration flag and a blind spot object existence flag. The vehicle deceleration flag indicates deceleration of a vehicle in front of a preceding vehicle located immediately ahead of the own vehicle. The blind spot object existence flag indicates existence of the blind spot object. The target information and the flag information generated in the signal processor 18 are transmitted to the vehicle-to-vehicle interval control ECU 20.

The navigation ECU 22 cooperates with a position sensor, a map data input device, operational switches, a display and a speaker (not shown) to form a navigation system of a known type. The navigation ECU 22 performs a current position display process, a route setting process and a route guidance process. In the current position display process, a current vehicle position mark is displayed on a map around the current vehicle position on the display. In the route setting process, a travel route to a destination is set. In the route guidance process, route guidance is provided through visual indication on the display and voice output from the speaker to guide the vehicle along the preset route, which is set through the route setting process. The navigation ECU 22 transmits intersection information, which indicates a distance from the own vehicle to a nearest upcoming intersection, to the vehicle-to-vehicle interval control ECU 20. Also, in a case where the route to the destination has been set, the navigation ECU 22 transmits left turn information, which indicates whether the vehicle should make a left turn at the upcoming intersection, to the vehicle-to-vehicle interval control ECU 20.

The engine ECU 24 transmits sensed information (a vehicle speed, an engine control state, an accelerator operational state) from a vehicle speed sensor, a throttle opening degree sensor and an accelerator pedal position sensor (not shown) to the vehicle-to-vehicle interval control ECU 20. Furthermore, the engine ECU 24 receives a target acceleration, a fuel cut-off demand and diagnostic information from the vehicle-to-vehicle interval control ECU 20. The engine ECU 24 controls a drive force of an internal combustion engine (a gasoline engine in this particular example) by outputting a drive command to, for example, a throttle actuator that adjusts a throttle opening degree of the engine based on an operational state, which is specified based on the information (the target acceleration, the fuel cut-off demand, the diagnostic information) received from the vehicle-to-vehicle interval control ECU 20.

The brake ECU 26 transmits a signal indicating a brake pedal state to the vehicle-to-vehicle interval control ECU 20. The brake pedal state is determined based on information from an M/C pressure sensor (not shown) in addition to sensed information (a steering angle and a yaw rate) from a steering sensor and a yaw rate sensor (not shown). The brake ECU 26 receives information (e.g., the target acceleration and the brake demand) from the vehicle-to-vehicle interval control ECU 20. Based on this received information and the brake pedal state, the brake ECU 26 drives a brake actuator, which opens and closes a pressurization control valve and a depressurization control valve of a brake hydraulic circuit to control a brake force.

An alarm buzzer (not shown) is connected to the vehicle-to-vehicle interval control ECU 20. The vehicle-to-vehicle interval control ECU 20 receives information of the current vehicle speed and the engine control state from the engine ECU 24 and also receives information of the steering angle state, the yaw rate state and the brake control state from the brake ECU 26. The vehicle-to-vehicle interval control ECU 20 further receives the intersection information and the left turn information from the navigation ECU 22 and the target information and the flag information from the radar 10. Furthermore, the vehicle-to-vehicle interval control ECU 20 transmits the vehicle deceleration flag and the blind spot object existence flag of the received flag information to the air bag ECU 28 through the LAN communication bus.

The vehicle-to-vehicle interval control ECU 20 performs a process of determining a target preceding vehicle, for which a vehicle-to-vehicle interval from the own vehicle is controlled. This target preceding vehicle is indicated by the target information and is determined based on a lane coinciding probability of the target preceding vehicle with respect to the own vehicle. The lane coinciding probability indicates a probability of that the target preceding vehicle is present on the same traveling lane as that of the own vehicle and is computed based on the vehicle speed and a radius of curvature of the traveling lane that is determined based on the steering angle. Furthermore, in order to appropriately control the vehicle-to-vehicle interval with respect to the target preceding vehicle, the vehicle-to-vehicle interval control ECU 20 executes an adaptive cruise control (ACC) control operation for outputting control command values to the engine ECU 24 and the brake ECU 26. More specifically, the vehicle-to-vehicle interval control ECU 20 outputs the target acceleration, the fuel cut-off demand and the diagnostic information to the engine ECU 24 as the control command values. Furthermore, the vehicle-to-vehicle interval control ECU 20 outputs the target acceleration and the brake demand to the brake ECU 26 as the control command values. Furthermore, the vehicle-to-vehicle interval control ECU 20 transfers the flag information, which is received from the front radar 10, to the air bag ECU 28. Also, when the flag information is set to an ON state (indicating presence of the vehicle in front of the preceding vehicle or presence of the object in the blind spot), the vehicle-to-vehicle interval control ECU 20 performs the corresponding control operation(s). This control operation(s) may include the control operation for achieving more effective braking, the control operation for limiting the acceleration of the vehicle speed, and/or the control operation for generating an alarm sound from the alarm buzzer to provoke the attention of the driver.

The air bag ECU 28 is of a known type, which senses a collision impact on a vehicle body at the time of occurrence of collision of the vehicle based on impact force information (an acceleration signal) outputted from a G sensor and actuates (expands) the air bag to implement a precrash safety system (PCS). The air bag ECU 28 changes an operational state of the air bag based on the flag information received from the front radar 10 through the vehicle-to-vehicle interval control ECU 20.

Figure 2:
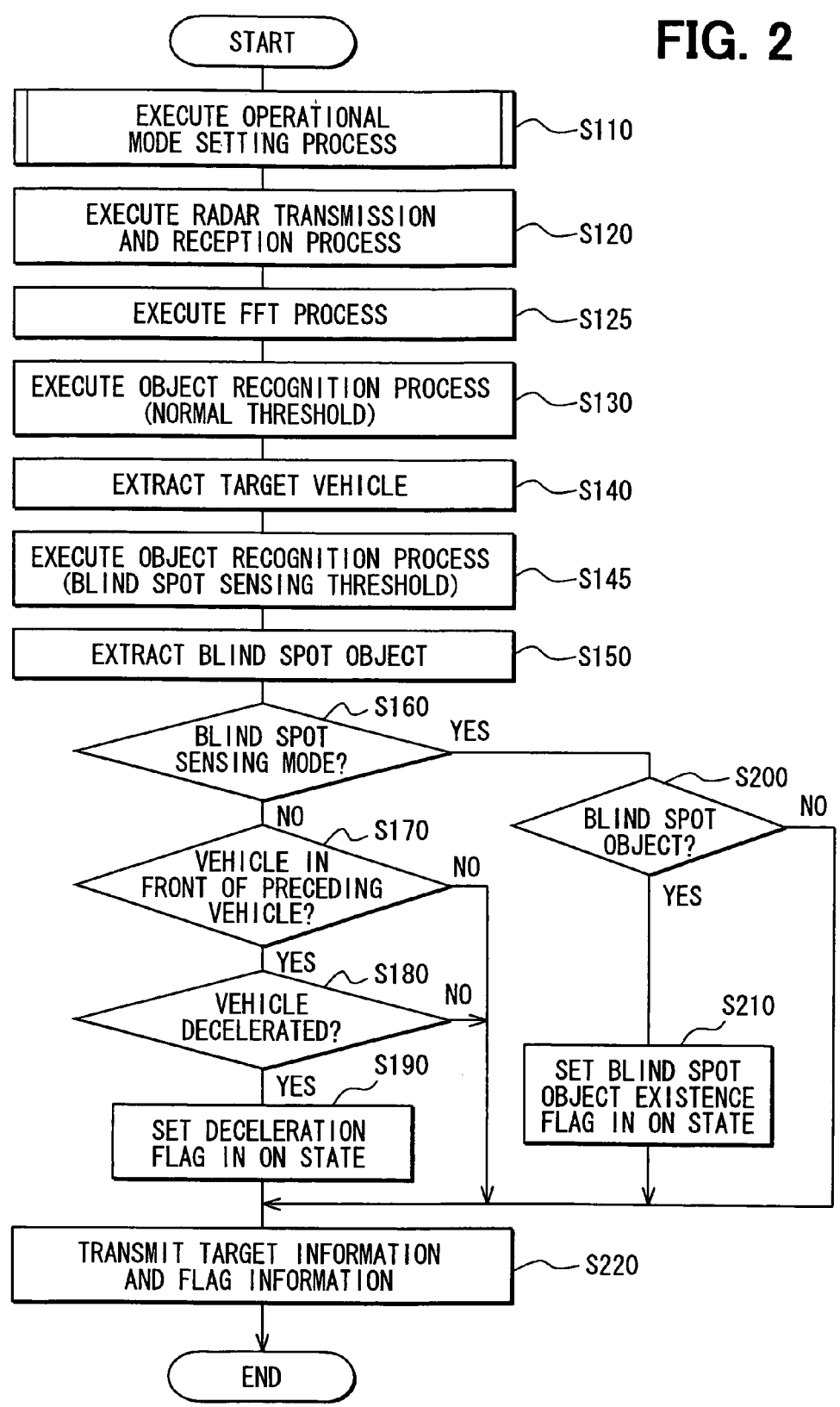
FIG. 2 is flowchart showing a control operation executed by a signal processor of a front radar of the vehicle control system.

Next, the process executed by the signal processor 18 of the front radar 10 will be described with reference to a flowchart of FIG. 2. This process is repeated at predetermined intervals.

When this process starts, an operational mode setting process for setting an operational mode of the signal processor 18 is executed at step S110. The operational mode is selected from a normal mode and a blind spot sensing mode. In an initial state, the operational mode is set to the normal mode.

Figure 3:
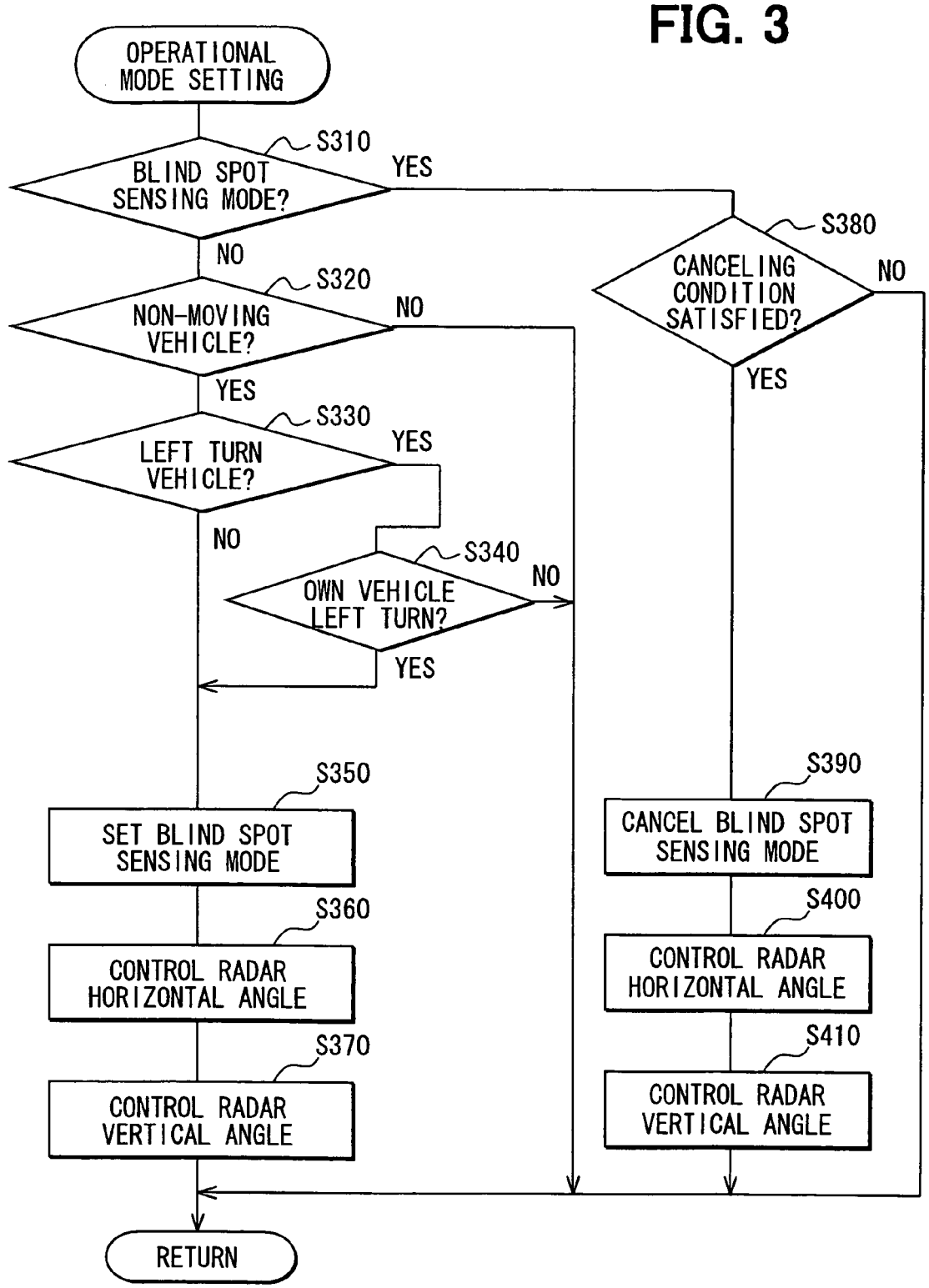
FIG. 3 is a flowchart showing an operational mode setting process executed as a part of the flowchart shown in FIG. 2.

In this operational mode setting process, as shown in a flowchart of FIG. 3, it is first determined whether the current operational mode is the blind spot sensing mode at step S310. When it is determined that the current operational mode is not the blind spot sensing mode and is thereby the normal mode at step S310 (i.e., NO at step S310), control proceeds to step S320. At step S320, it is determined whether a non-moving vehicle exists in front of the own vehicle based on the target information obtained in the previous operation. When it is determined that the non-moving vehicle does not exist in front of the own vehicle at step S320 (i.e., NO at step S320), the current process is terminated.

When it is determined that the non-moving vehicle exists in front of the own vehicle at step S320 (i.e., YES at step S320), control proceeds to step S330. At step S330, it is determined whether the non-moving vehicle is a left turn vehicle in an oncoming lane (hereinafter, simply referred to as a left turn vehicle). The determination of step S330 is made based on the intersection information, which is obtained from the navigation ECU 22 through the vehicle-to-vehicle interval control ECU 20, and the target information of the non-moving vehicle (particularly, the distance and azimuth of the non-moving vehicle with respect to the own vehicle).

When it is determined that the non-moving vehicle is the left turn vehicle at step S330 (i.e., YES at step S330), control proceeds to step S340. At step S340, it is determined whether the own vehicle is about to make a left turn. This determination at step S340 is made based on the left turn information from the navigation ECU 22 or an input from a turn direction indicator (not shown) of the vehicle.

When it is determined that the own vehicle is not about to make the left turn at step S340 (i.e., NO at step S340), the current process is terminated. Returning to step S330, when it is determined that the non-moving vehicle is not the left turn vehicle (i.e., NO at step S330) or when it is determined that the own vehicle is about to make the left turn at step S340 (i.e., YES at step S340), a predetermined operational mode change condition is satisfied, and thereby control proceeds to step S350. At step S350, the operational mode is changed to the blind spot sensing mode. Next, at step S360, the horizontal angle (radar horizontal angle) of the radar transceiver 12 is controlled through the horizontal drive device 14 in such a manner that the transmission direction of the radar wave is directed to a point below the floor of the non-moving vehicle. Then, at step S370, the vertical angle (radar vertical angle) of the radar transceiver 12 is controlled through the vertical drive device 16. Then, the current process is terminated.

Returning to step S310, when it is determined that the current operational mode is the blind spot sensing mode (i.e., YES at step S310), control proceeds to step S380. At step S380, it is determined whether a condition for canceling the blind spot sensing mode has been satisfied. Specifically, for example, when the current position of the own vehicle has passed the position of the non-moving vehicle, which has caused the setting of the blind spot sensing mode, it may be determined that the condition for canceling the blind spot sensing mode has been satisfied.

When it is determined that the condition for canceling the blind spot sensing mode has not been satisfied at step S380 (i.e., NO at step S380), the current process is terminated. In contrast, when it is determined that the condition for canceling the blind spot sensing mode has been satisfied at step S380 (i.e., YES at step S380), control proceeds to step S390. At step S390, the blind spot sensing mode is cancelled, and thereby the operational mode is changed to the normal mode. Then, at step S400, the horizontal angle of the radar transceiver 12 is controlled through the horizontal drive device 14 such that the transmission direction of the beam of the radar wave is reset to a predetermined horizontal reference direction. Then, at step S410, the vertical angle of the radar transceiver 12 is controlled through the vertical drive device 16 such that the transmission direction of the beam of the radar wave is reset to a predetermined vertical reference direction. Then, the current process is terminated.

That is, when the left turn vehicle is present on the oncoming lane, and the own vehicle is about to make the left turn (or when the non-moving vehicle other than the left turn vehicle exists), the operational mode is set to the blind spot sensing mode. Then, the radar wave is transmitted toward the point below the floor of the non-moving vehicle (the left turn vehicle) until the condition for canceling the blind spot sensing mode is satisfied.

Returning to FIG. 2, after the execution of the operational mode setting process at step S110, control proceeds to step S120. At step S120, a radar transmission and reception process is executed. In the radar transmission and reception process, the radar transceiver 12 is driven to transmit and receive the radar wave, and the beat signal, which is generated in the radar transceiver 12, is sampled. Furthermore, the sampling data, which is obtained in the radar transmission and reception process, is processed through an FFT process at step S125. Then, at step S130, as shown in FIG. 8, a frequency peak, which has a reception level larger than a preset normal threshold value T1 (corresponding to a first threshold value), is extracted from the frequency spectrum that is the result of the FFT process at step S125, and an object recognition process is executed to recognize various objects (e.g., a vehicle, an object at a road side, an obstacle) located ahead of the own vehicle based on the extracted frequency peak.

The object recognition, which is executed based on the frequency peak extracted from the result of the FFT process of the beat signal, is well known in the field of the FMCW radar and therefore will not be described further.

Next, at step S140, a target vehicle to be monitored (a preceding vehicle, which travels ahead of the own vehicle, or a non-moving vehicle, which is parked on a traveling road, along which the own vehicle travels) is extracted based on a history of a sensing result (a position, the speed and a size) of the object, which is sensed in the object recognition process at step S130.

Figure 8:
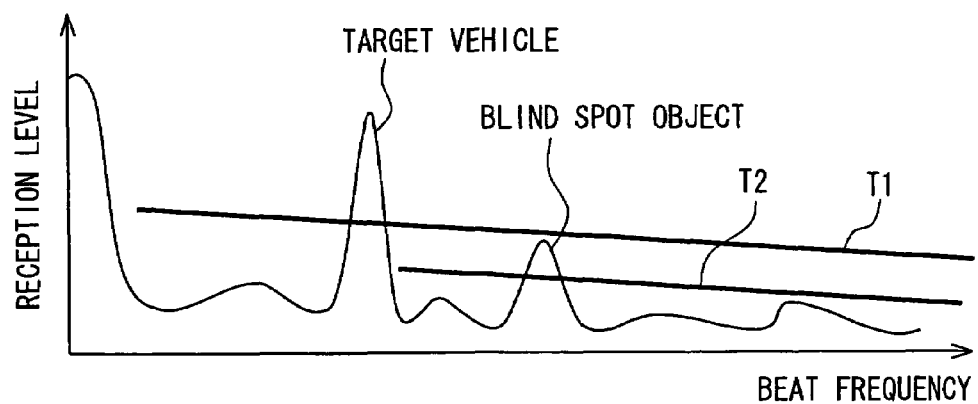
FIG. 8 is a descriptive diagram showing changing of a threshold value between a case of sensing a target object and a case of sensing a blind spot object.

Then, at step S145, as shown in FIG. 8, the frequency peak, which shows the reception level larger than a blind spot sensing threshold value T2 (corresponding to a second threshold value) that is lower than the normal threshold value T1, is extracted based on the frequency spectrum that is the result of the FFT process at step S125, and an object recognition process is executed to recognize various objects, which are positioned further away from the own vehicle in comparison to the extracted target vehicle extracted at step S140, based on the extracted peak frequency.

Then, at step S150, a blind spot object is extracted from the objects sensed through the object recognition process at step S145. The blind spot object is an object that is located in a blind spot (hereinafter, referred to as a blind spot of the target vehicle), which cannot be seen from the own vehicle due to the presence of the target vehicle extracted at step S140. At the time of extracting the target vehicle or the blind spot object, information about the distance, the azimuth and the relative speed of the target object or of the blind spot object with respect to the own vehicle is extracted.

Thereafter, at step S160, it is determined whether the current operational mode, which is set at step S110, is the blind spot sensing mode. When it is determined that the current operational mode is not the blind spot sensing mode at step S160 (i.e., NO at step S160), control proceeds to step S170. At step S170, it is determined whether the object (the blind spot object) in the blind spot of the target vehicle (in this instance, the preceding vehicle, which travels ahead of the own vehicle) extracted at step S140 exists, i.e., it is determined whether the vehicle in front of the preceding vehicle exits.

When it is determined that the vehicle in front of the preceding vehicle exists at step S170 (i.e., YES at step S170), control proceeds to step S180. At step S180, it is determined whether the vehicle in front of the preceding vehicle is decelerated. When it is determined that the vehicle in front of the preceding vehicle is decelerated at step S180 (i.e., YES at step S180), the vehicle deceleration flag is placed in an ON state at step S190. Then, control proceeds to step S220.

When it is determined that the vehicle in front of the preceding vehicle does not exist at step S170 (i.e., NO at step S170) or when it is determined that the vehicle in front of the preceding vehicle is not decelerated at step S180 (i.e., NO at step S180), control proceeds to step S220 without placing the vehicle deceleration flag into the ON state.

Returning to step S160, when it is determined that the current operational mode is the blind spot sensing mode (i.e., YES at step S160), control proceeds to step S200. At step S200, it is determined whether a blind spot object, which has a high possibility of moving out of the blind spot of the target vehicle (in this instance, the non-moving vehicle that may include the left turn vehicle) extracted at step S140, exists, more specifically, it is determined whether a straight-through vehicle, which is about to enter the intersection, or a vehicle or a pedestrian, which is about to pass in front of the non-moving vehicle, exists. When it is determined that such a blind spot object exists at step S200 (i.e., YES at step S200), control proceeds to step S210. At step S210, the blind spot object existence flag is placed into an ON state. Then, control proceeds to step S220. In contrast, when it is determined that such a blind spot object does not exist at step S200 (i.e., NO at step S200), control proceeds to step S220 without placing the blind spot object existence flag into the ON state.

Finally, at step S220, the target information (e.g., the distance, the azimuth, the relative speed) of the target vehicle extracted at step S140 and the flag information (the vehicle deceleration flag or the blind spot object existence flag) set at step S190 or S210 are transmitted to the vehicle-to-vehicle interval control ECU 20, and the current process is terminated.

The target information and the flag information are used in the various control operations (e.g., the ACC control operation, the warning generation control operation) in the vehicle-to-vehicle interval control ECU 20. Furthermore, the flag information is transferred to the other ECUs through the LAN communication bus and is used in, for example, the control operations (the PCS control operation) in the air bag ECU 28.

Figure 4:
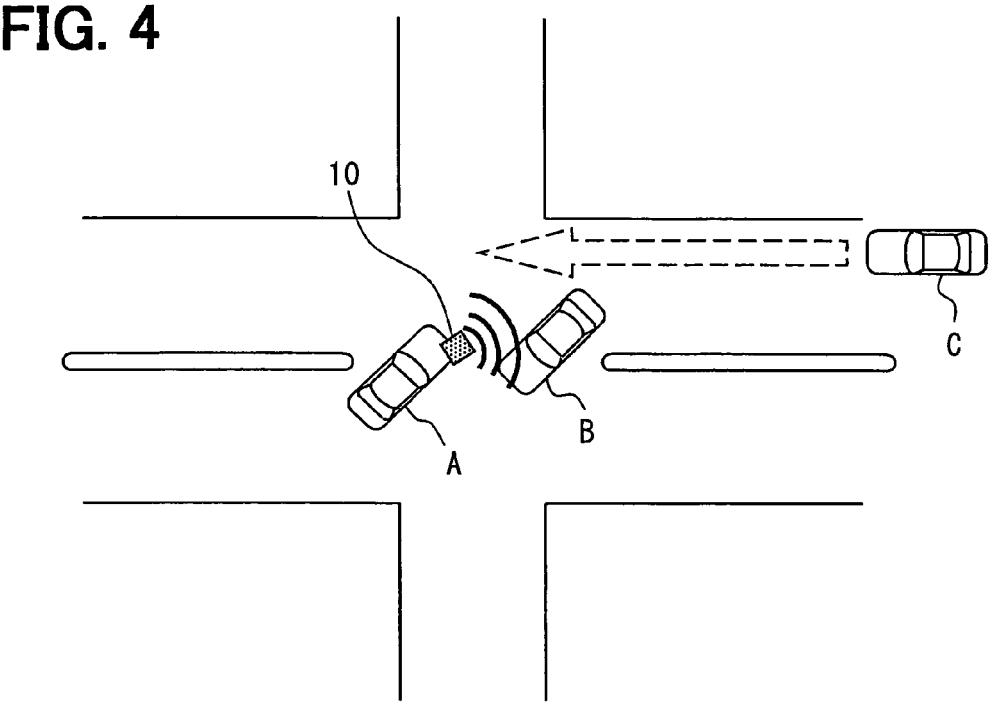
FIG. 4 is a descriptive view showing an area around an own vehicle in a case where a left turn vehicle exists in an oncoming lane.

For example, with reference to FIG. 4, when a non-moving vehicle (a left turn vehicle) B, which stops near the center of an intersection to make a left turn, is sensed, and it is determined that the own vehicle A is about to make a left turn in that intersection, the operational mode of the vehicle control system 1 becomes the blind spot sensing mode, so that the radar wave is outputted from the front radar 10 toward a point below the floor of non-moving vehicle B. In this way, a straight-through vehicle (a blind spot vehicle) C, which enters the intersection from the blind spot that is hidden by the left turn vehicle B, can be more easily sensed by the radar wave that is transmitted below the floor of the left turn vehicle B.

Figure 5:
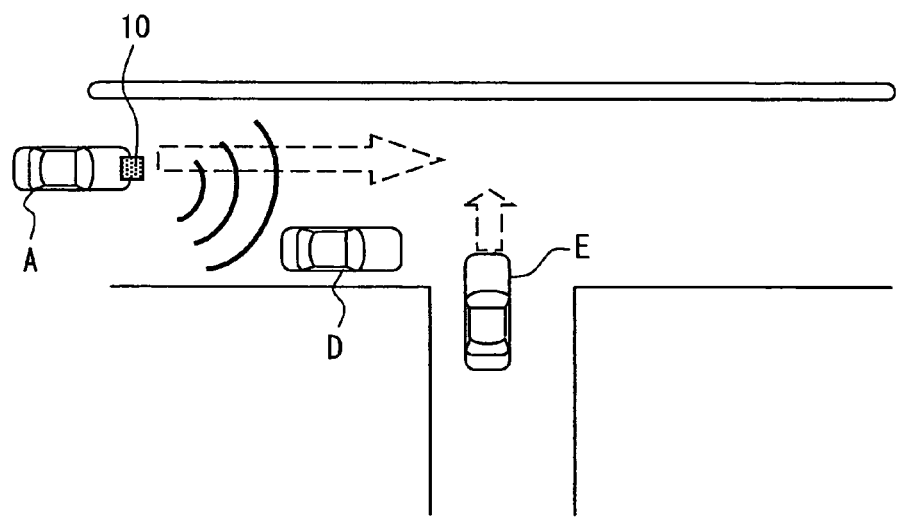
FIG. 5 is a descriptive view showing an area around an own vehicle in a case where a non-moving vehicle exists.

Furthermore, for example, with reference to FIG. 5, when a non-moving vehicle D, which is other than a left turn vehicle and is stopped on the road, is sensed, the operational mode also becomes the blind spot sensing, so that the radar wave is outputted from the front radar 10 toward a point below a floor of the non-moving vehicle D. Through use of this radar wave, it is eased to sense an object (e.g., a vehicle E or a pedestrian passing in front of the non-moving vehicle D) in a blind spot, which is hidden by the non-moving vehicle D.

When the object in the blind spot is sensed, the blind spot object existence flag is set to the ON state. Thus, the vehicle-to-vehicle interval control ECU 20, which has received this blind spot object existence flag, executes the control operation to operate the alarm buzzer, so that the alarm sound is generated from the alarm buzzer to call the attention of the driver. In this instance, only the alarm buzzer is operated. Here, in addition to or alternative to the use of the alarm buzzer, a visual indication on a visual indicator (e.g., the display) may be provided. Furthermore, it is possible to execute a vehicle control operation, which avoids the upcoming danger (e.g., collision), in addition to the operation of the alarm buzzer (and/or the operation of visual indicator).

Figure 6:
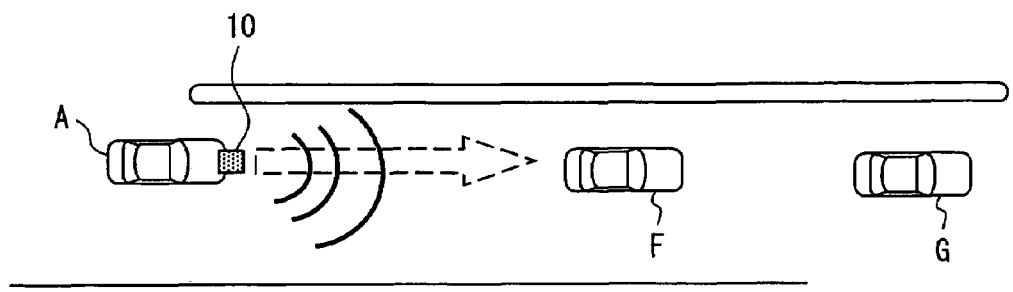
FIG. 6 is a descriptive view showing an area around an own vehicle in a case where a vehicle exists in front of a preceding vehicle.

Furthermore, with reference to FIG. 6, in a state where a preceding vehicle F, which may cause the ACC control operation of the own vehicle A, is sensed on a highway (or a freeway), particularly, in a state where a distance from the own vehicle A to the preceding vehicle F is relatively long, the radar wave can be easily transmitted below the floor of the preceding vehicle F. Thus, it possible to sense a vehicle G, which travels in front of the preceding vehicle F and is located in a blind spot of the preceding vehicle F, through use of the radar wave that is transmitted below the floor of the preceding vehicle F without changing the transmission direction of the radar wave.

When the vehicle G in front of the preceding vehicle F is sensed, and deceleration of the vehicle G in front of the preceding vehicle F is sensed, the vehicle deceleration flag is placed in the ON state. As a result, the vehicle-to-vehicle interval control ECU 20, which has received this vehicle deceleration flag, can perform the ACC control operation, which is executed in consideration of the behavior (e.g., the acceleration or deceleration) of the vehicle G in front of the preceding vehicle F.

As described above, in the vehicle control system 1, the non-moving vehicle (including the left turn vehicle) or the preceding vehicle serves as the target vehicle, and the information with respect to the state in the blind spot formed by the target vehicle is obtained from the received signal of the radar wave. Thus, the information with respect to the blind spot object can be easily and reliably obtained without relying on the infrastructure (e.g., the communication device located at the side of the road) or the on-vehicle device on the other vehicle, and the control operation(s), which uses the information with respect to the blind spot object, can be performed.

Furthermore, in the vehicle control system 1, in the case of extracting the frequency peak from the result of the FFT process performed on the beat signal, when the object, which is the candidate of the blind spot object, is sensed, the frequency peak of the reception level, which is lower than that of the object that is the candidate of the target vehicle, is also sensed. Thus, the object in the blind spot, which causes the low reception level that is lower than that of the normal time, can be reliably sensed.

Also, in the vehicle control system 1, when the target vehicle is the non-moving vehicle, the transmission direction of the radar wave is directed to the point below the floor of the non-moving vehicle to allow transmission of the radar wave to the object located in the blind spot. Therefore, it is possible to reliably sense the object in the blind spot.

Furthermore, in the vehicle control system 1, when the vehicle in front of the preceding vehicle or the object in the blind spot exists, the operation of the alarm buzzer, the brake control operation and/or the accelerator control operation for avoiding the upcoming danger and/or the PCS control operation may be executed. In this way, the driving safety is improved.

In the above embodiment, the front radar 10 corresponds to an on-vehicle radar device. The radar transceiver 12 corresponds to a transmitting and receiving means. Steps S120 to S130 and S135 correspond to an object sensing means. Step S140 corresponds to a target vehicle extracting means. Step S150 corresponds to a blind spot object extracting means. The horizontal drive device 14, the vertical drive device 16 and step S110 (more specifically, steps S310 to S410) correspond to a transmission direction changing means. The vehicle-to-vehicle interval control ECU 20, the engine ECU 24, the brake ECU 26 and/or the air bag ECU 28 correspond to a notifying means or a control means.

The present invention is not limited to the above embodiment, and the above embodiment can be modified in various ways without departing from the scope of the present invention.

For example, in the above embodiment, the transmission direction of the radar wave is mechanically changed. Alternatively, an array antennae may be employed, and the transmission direction of the radar wave may be changed in an electrical way or in a mathematical way (beam forming).

In the above embodiment, the transmission direction of the radar wave is changed in both of the horizontal direction and the vertical direction. Alternatively, the transmission direction of the radar wave may be changed only in the vertical direction.

In the above embodiment, in the normal mode, the transmission direction of the radar wave is fixed in the horizontal reference direction and the vertical reference direction. Alternatively, the vertical angle of the transmission direction of the radar wave may be changed based on the distance from the own vehicle to the preceding vehicle.

In the above embodiment, the sensing operation of the blind spot object (the vehicle in front of the preceding vehicle) and the sensing operation of the blind spot object in the blind spot formed by the non-moving vehicle are performed through use of the single front radar 10. Alternatively, a plurality of radar devices may be employed to perform the above sensing operations by the different radar devices.

In the above embodiment, the FMCW radar is used as the front radar 10. Alternatively, any other type of radar may be employed as the front radar 10 as long as the radar uses the reflection of the radio wave.

Figure 7:
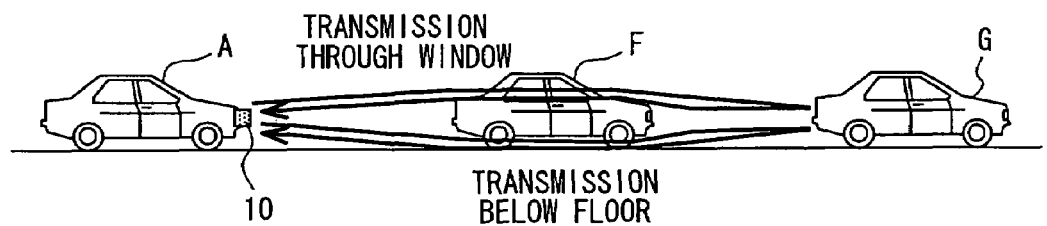
FIG. 7 is a descriptive view showing transmission of a radar wave outputted from the front radar.

In the above embodiment, the radar wave outputted from the front radar 10 is transmitted below the floor of the target vehicle (the preceding vehicle, the non-moving vehicle). However, in some cases, the front radar 10 may be modified to transmit the radar wave through a rear window glass and a front window glass of the target vehicle, such as the preceding vehicle F of FIG. 7, in addition to or alternative to the transmission of the radar wave below the floor of the target vehicle to sense the blind spot object, such as the blind spot vehicle G of FIG. 7. In general, the transmission of the radar wave below the floor of the target vehicle is more effective than the transmission of the radar wave through the window glasses of the target vehicle.

Additional advantages and modifications will readily occur to those skilled in the art. The invention in its broader terms is therefore not limited to the specific details, representative apparatus, and illustrative examples shown and described.

What is claimed is:

1. An on-vehicle radar device comprising:
   transmitting and receiving means for transmitting and receiving a radar wave in a form of a radio wave;
   object sensing means for sensing a plurality of objects, which are spaced away from a vehicle having the on-vehicle radar device and reflect the transmitted radar wave, based on an output of the transmitting and receiving means;
   target vehicle extracting means for extracting a target vehicle to be monitored from the plurality of sensed objects; and
   blind spot object extracting means for extracting a blind spot object, which is present in a blind spot of the target vehicle extracted by the target vehicle extracting means, from the plurality of sensed objects through use of propagation of the radio wave that is directed from the transmitting and receiving means toward the target vehicle.

2. The on-vehicle radar device according to claim 1, further comprising a transmission direction changing means for changing at least a vertical angle of a transmission direction of the radar wave, which is transmitted from the transmitting and receiving means, in such a manner that the radar wave is directed toward a point below a floor of the target vehicle when a predetermined operational mode change condition is satisfied.

3. The on-vehicle radar device according to claim 2, wherein the transmission direction changing means is also for changes a horizontal angle of the transmission direction of the radar wave, which is transmitted from the transmitting and receiving means, in such a manner that the radar wave is directed toward the point below the floor of the target vehicle when the predetermined operational mode change condition is satisfied.

4. The on-vehicle radar device according to claim 2, wherein the predetermined operational mode change condition, which is used by the transmission direction changing means to change the transmission direction of the radar wave, includes that the target vehicle extracted by the target vehicle extracting means is a non-moving vehicle on a road.

5. The on-vehicle radar device according to claim 4, wherein the predetermined operational mode change condition, which is used by the transmission direction changing means to change the transmission direction of the radar wave, further includes that the non-moving vehicle is an oncoming vehicle, which is about to make a left turn in an intersection where the vehicle having the on-vehicle radar device is about to make a left turn.

6. The on-vehicle radar device according to claim 1, wherein the target vehicle, which is extracted by the target vehicle extracting means, is a preceding vehicle located ahead of the vehicle having the on-vehicle radar device and is traveling on a travel lane of the vehicle having the on-vehicle radar device.

7. The on-vehicle radar device according to claim 1, wherein:
   the target vehicle extracting means extracts the target vehicle from the plurality of sensed objects when a reception level of the reflected radar wave, which is reflected from the target vehicle, is greater than a predetermined first threshold value; and
   the blind spot object extracting means extracts the blind spot object from the plurality of sensed objects when the blind spot object satisfies the following conditions:
      the blind spot object is located further away from the vehicle having the on-vehicle radar device in comparison to the target vehicle; and
      a reception level of the reflected radar wave, which is reflected from the blind spot object, is greater than a predetermined second threshold value, which is lower than the first threshold value.

8. A vehicle control system comprising the on-vehicle radar device according to claim 1.

9. The vehicle control system according to claim 8, further comprising a notifying means for notifying a driver of the vehicle having the vehicle control system about presence of the blind spot object when the blind spot object extracting means extracts the blind spot object.

10. The vehicle control system according to claim 8, further comprising a control means for controlling at least one of an accelerator and a brake of the vehicle having the vehicle control system based on a behavior of the blind spot object when the blind spot object extracting means extracts the blind spot object.

11. An on-vehicle radar device comprising:
   a transmitting and receiving means for transmitting and receiving a radar wave in a form of a radio wave;
   an object sensing means for sensing a plurality of objects, which are spaced away from a vehicle having the on-vehicle radar device and reflect the transmitted radar wave, based on an output of the transmitting and receiving means;
   a target vehicle extracting means for extracting a target vehicle to be monitored from the plurality of sensed objects; and
   a blind spot object extracting means for extracting a blind spot object, which is present in a blind spot of the target vehicle extracted by the target vehicle extracting means, from the plurality of sensed objects, the blind spot object having a reception level lower than a reception level of the target vehicle.

* * * * *